Aug. 3, 1926.

D. R. FIGG 1,594,715

ELECTRIC BRAKE

Filed Oct. 8, 1919

Witness:
Jas. E. Hutchinson

Inventor:
Dale R. Figg,
By
Milans & Milans Attorneys

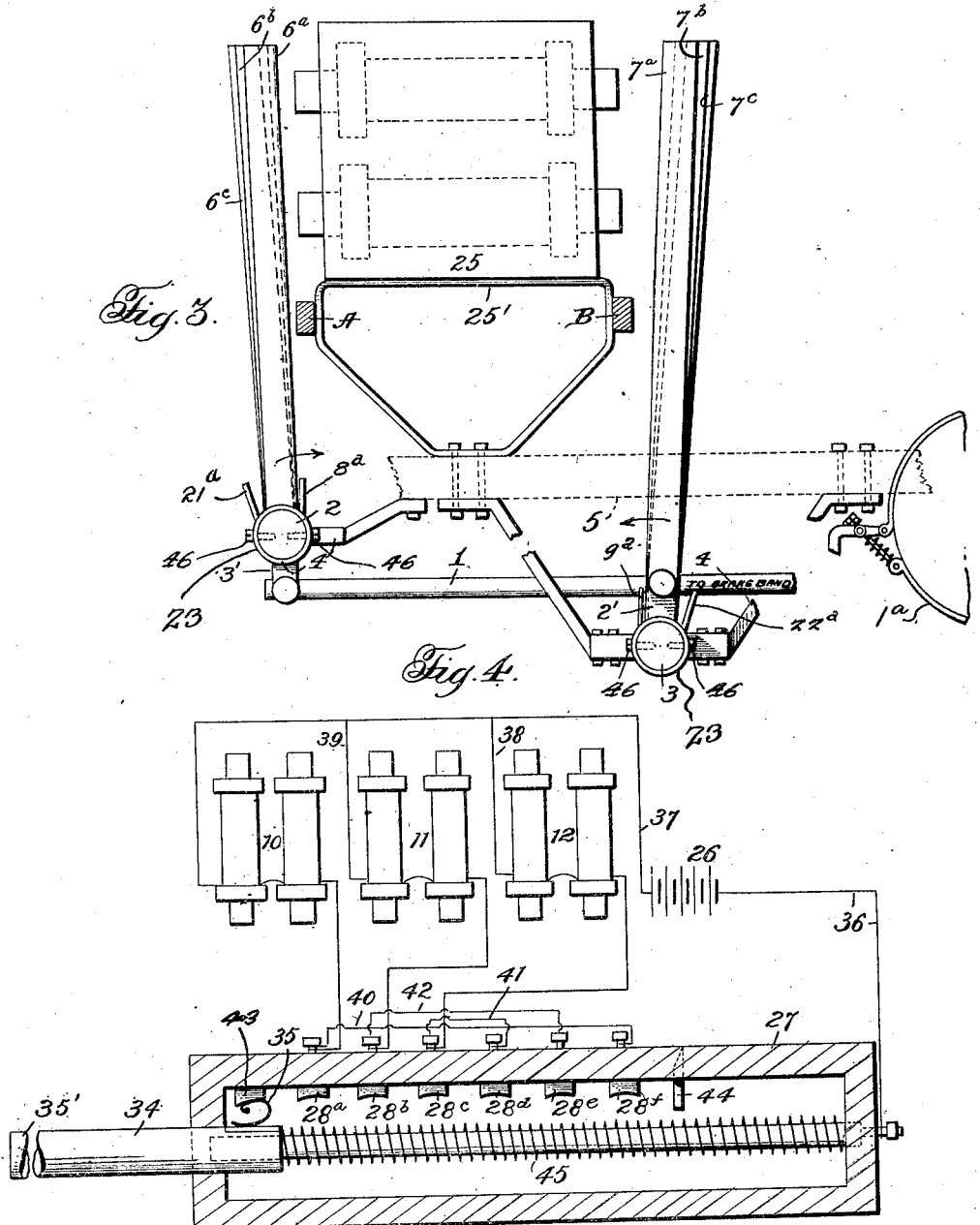

Patented Aug. 3, 1926.

1,594,715

UNITED STATES PATENT OFFICE.

DALE R. FIGG, OF SHEPHERD, MICHIGAN.

ELECTRIC BRAKE.

Application filed October 8, 1919. Serial No. 329,302.

This invention relates to improvements in electric brakes susceptible of general application but particularly useful for motor vehicles.

Objects of the invention are to provide an improved, simple, practical form of electric brake that will be entirely dependable in operation, that can be readily applied to standard types of automobiles, one that can be conveniently controlled from the steering wheel or pillar of a motor vehicle with practically no effort on the part of the driver, to provide a brake of this nature adapted to gradually apply the brake element and to make different applications of the brake element to suit different conditions, the different degrees or extent of the application of the brake element being determined beforehand and readily brought into play by a selective system of control.

The invention, with other objects and advantages, and the particular construction, combinations and arrangement of parts comprising the same, will be understood from the hereinafter contained detail description when considered in connection with the accompanying drawings forming part thereof and illustrating one embodiment of the invention.

In the drawings:—

Figure 3 is an end elevation, certain of the parts at the outer sides of the actuating levers, being left off for the sake of clearness.

Fig. 4 is a detail longitudinal section of the control switch shown clamped to the steering pillar, and illustrating at the top of the figure diagrammatically the circuit connections of the control switch with the source of electrical energy and the arrangement of the electromagnets in the circuit.

Figure 1:
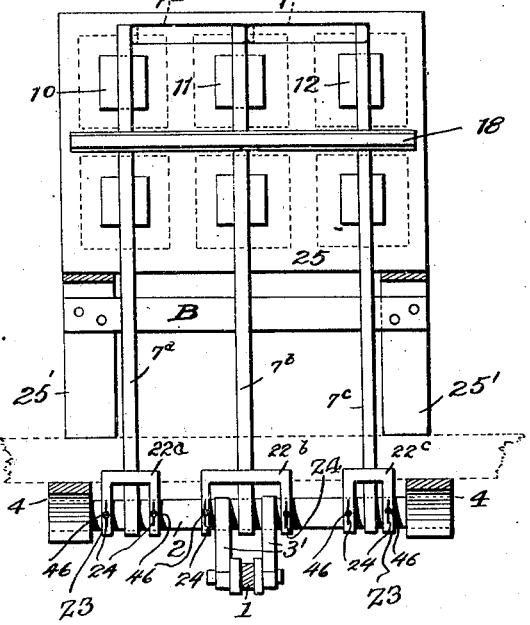
Figure 1 is a side elevation, with parts shown in section, of electric brake mechanism constructed in accordance with the present invention.

The invention comprehends a series of actuating members or levers operatively connected with the brake element and adapted to effect different applications of the brake element and to gradually apply the same, with electromagnetic means for operating the actuating members, and a selective system of control for successively bringing the series of actuating members into play.

In the drawings, 1 designates a longitudinally shiftable rod of a conventional type of automobile brake, said rod 1 having one end connected to the brake band 1ª.

Figure 2:
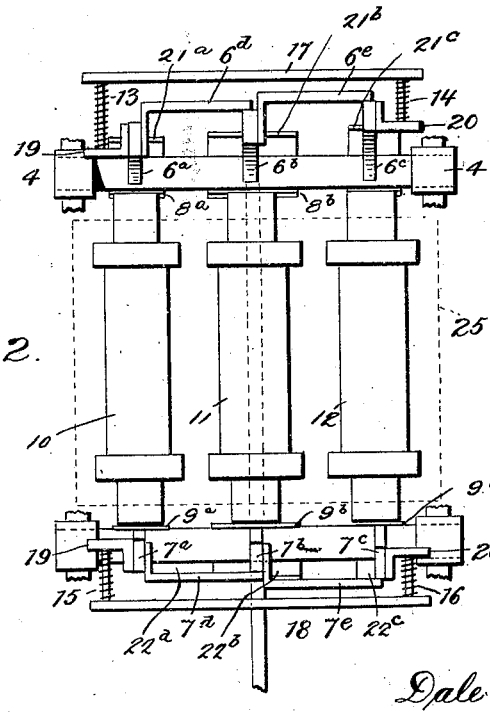
Fig. 2 is a top plan view.

The particular embodiment of the invention illustrated in the drawings comprises a pair of spaced parallel rock shafts 2—3 suitably mounted in hangers 4 secured to a part 5 of the motor vehicle frame, said rock shafts being arranged one above the other with the brake rod 1 extending therebetween, the respective rock shafts having arms 2'—3' pivotally connected with the rod 1, this arrangement providing for transmitting movement to the rod in the same direction by both of the rock shafts when turned in opposite directions. $6^a$, $6^b$, $6^c$, $7^a$, $7^b$, and $7^c$ designate oppositely disposed rows of levers, which, in the present instance, constitute the series of actuating members, said levers being loosely mounted at their lower ends upon the respective rock shafts 2—3 to swing thereabout and adapted, when moved inwardly in the direction of the arrows (see Fig. 3), to engage sets of abutments $8^a$, $8^b$, $8^c$, $9^a$, $9^b$ and $9^c$ on said shafts and turn the same. The series of actuating levers are adapted to act independently of each other in succession to turn the shafts 2—3 different distances, step by step, starting with lever $6^a$ and on throughout the series, the last lever to act being the lever $7^c$, (see particularly Figs. 2 and 4 of the drawings), the abutments $8^a$, $8^b$, $8^c$, $9^a$, $9^b$ and $9^c$ being arranged in proper spaced relation about the shafts to obtain this result, so that the series of levers, through the intermediate connections, will function to gradually apply the brake element, each actuating lever constituting a separate medium for effecting a certain definite application of the brake element different from the others, the extent or pressure of the applications made by the respective levers throughout the series gradually increasing.

The electromagnetic means for operating the series of actuating levers comprises a plurality of electromagnetic units or sets 10, 11, and 12, each of said units or sets consisting of one or more electromagnets as conditions may demand, in the present showing, there being two electromagnets to each set. 25 designates a casing of wood or other suitable non-conducting and non-magnetic material for the electromagnetic sets, said casing having openings at opposite ends through which the ends of the magnets project. The casing 25 is supported on the vehicle frame by suitable hangers or brackets 25'. The electromagnets are of the straight type and each one of said units or sets 10, 11 and 12 is disposed between a pair of the oppositely disposed actuating levers with their opposite poles facing opposite levers of the pair and adapted to operate the same, the portions of the levers opposite the poles of the magnets being of metal readily subject to magnetic attraction. The rows of levers $6^a$, $6^b$, $6^c$, $7^a$, $7^b$ and $7^c$ are normally held spaced different distances from the poles of the electromagnetic units or sets 10, 11 and 12, only the first lever $6^a$ of the series being within the effective range of its electromagnetic set 10, means being provided whereby each of the other actuating levers will be successively positioned within the effective range of its magnetic set as the preceding lever is operated. The means for this purpose consists of laterally projecting portions $6^d$ and $6^e$ overlapping, respectively, levers $6^b$ and $6^c$ and laterally projecting portions $7^d$ and $7^e$ overlapping levers $7^b$ and $7^c$, the lever $7^a$ being brought into position through the connection of the rock shafts 2—3 by the rod 1. Coil springs 13, 14, 15 and 16 act to normally maintain the levers in proper spaced relation from the ends of the electromagnet sets, said springs functioning to hold the lateral projecting portions $6^d$, $6^e$, $7^d$, $7^e$, in contact with the respective levers and preventing rattling. Strips 17—18 are fixedly supported in any suitable manner on the vehicle frame at the outer sides of the rows of actuating levers. The springs 13—15 are expansion springs each bearing at one end against one of the strips 17—18 and at the other end against a laterally projecting portion 19 on the lever $6^a$—$7^a$, while coil springs 14—16 are tension springs acting in opposition to the first mentioned springs and connected to respective strips 17—18 and lateral projections 20 on actuating levers $6^c$—$7^c$. If desired, stop bars A—B may be employed to prevent the levers from being drawn into actual contact with the poles of the electromagnet sets. The rock shafts 2—3 also have respectively abutments $21^a$, $21^b$, $21^c$, $22^a$, $22^b$ and $22^c$ spaced from the abutments $8^a$, $8^b$, $8^c$, $9^a$, $9^b$ and $9^c$ to cooperate with the actuating levers, said abutments serving as stops for the levers in the return of the levers to normal position through the usual spring mechanism (not shown) that is associated with the brake band or rod 1, the springs 14, 16, also assisting in the return of the levers to normal position.

The pairs of abutments $8^a$, $9^a$, $21^a$, $22^a$, etc. on the shafts 2—3 are shown carried at the ends of bands 23, which are provided with slots 24 and held fixed on the shaft by clamp screws 46 engaging the slots 24, this construction providing for the ready adjustment of the abutments relatively to each other to obtain the desired movement of the rock shafts 2—3 by the series of actuating levers.

Any suitable source of electrical energy may be employed to energize the electromagnet sets 10, 11 and 12, either the usual battery or dynamo of the motor vehicle, or a separate storage battery may be provided for this purpose. Referring particularly to Fig. 4 of the drawings, 26 designates the storage battery.

A selective control is provided for separately energizing the electromagnet sets to singly and successively operate the series of actuating levers. This is shown in the present instance as a switch having a rectangular-shaped housing 27 with a series of fixed contacts $28^a$, $28^b$, $28^c$, $28^d$, $28^e$ and $28^f$. 34 designates the movable member of the switch in the form of a rod slidable longitudinally within the housing 27 and provided with a spring contact 35 to cooperate with the series of fixed contacts $28^a$, $28^b$, $28^c$ and $28^d$, $28^e$ and $28^f$. The rod 34, which is supported for sliding movement in bearings in the end walls of the housing 27, has at one end an operating handle 35' projecting from one end of the housing 27 and at its other end an electrical connection 36 with one side of the battery 26. The electromagnet sets 10, 11 and 12 are arranged in circuit branches 37, 38, 39, leading respectively from the other side of the battery 26 to contacts $28^a$, $28^b$ and $28^c$. 40, 41 and 42 are circuit branches leading respectively from the contacts $28^a$, $28^b$ and $28^c$ to the contacts $28^d$, $28^e$ and $28^f$. 43 and 44 are stops formed of porcelain or the like mounted on the casing to limit the movement of the switch rod, and 45 is a coiled spring acting to normally maintain the switch rod in its uppermost inoperative position, as shown in the drawings. As shown in Fig. 6 of the drawings, the switch is secured in any suitable way to the steering pillar C with its operating handle 35 within convenient reach of the driver.

In operating the brake, as the handle 35' of the switch is forced down the spring contact 35 engages the fixed contacts $28^a$, $28^b$, $28^c$, $28^d$, $28^e$ and $28^f$, the battery being first connected with the electromagnetic set 10 through the contact $28^a$ and the first actuating lever $6^a$ of the series operated, the magnet sets 11 and 12 are next energized in order to operate the actuating levers $6^b$ and $6^c$. When the contacts $28^d$, $28^e$ and $28^f$ are engaged, the electromagnet sets, beginning with 10, are again connected successively with the battery 26 to operate the levers $7^a$, $7^b$ and $7^c$, the engagement of the spring contact 35 with the series of fixed contacts $28^a$, $28^b$, $28^c$, $28^d$, $28^e$ and $28^f$ being almost instantaneous, resulting in a continuous gradually increasing application of the brake band, it being understood that the switch rod 34 may be operated to bring different numbers of the actuating levers into play to obtain different applications of the brake element.

It will be noted that my improved brake provides for a gradual application of the brake element, and applications thereof, at a number of different pressures, that the brake can be conveniently controlled and operated with practically no effort on the part of the driver. It will also be observed that the special construction and arrangement of parts, hereinbefore described, provides for successively operating the actuating levers with a minimum number of electromagnets or sets, and affords a very compact structure, one that can be readily applied to various types of cars.

It will also be understood that while I have illustrated in the drawings a specific embodiment of the invention, changes and obvious modifications in the particular construction shown, variation in the number of actuating levers and electromagnets and sets may be made, and the invention practiced in many different forms as will appeal to those skilled in the art and falling within the scope of the appended claims without departing from the spirit of the invention.

What I claim is:

1. In a brake the combination with a brake element, of a series of movable actuating members operatively associated with the brake element to apply the same with different and gradually increasing pressures, and electromagnetic means for successively operating said actuating members as desired to make different applications of the brake.

2. In a brake the combination with a brake element, of a plurality of movable actuating members operatively associated with the brake element and adapted to apply the same at different pressures, a plurality of electromagnets for operating said actuating members, one electromagnet for each of said members, a source of electrical energy, and means for connecting the electromagnets singly with the source of electrical energy to effect different applications of the brake.

3. In a brake the combination with a brake element, of a series of movable actuating members operatively associated with the brake element to apply the same with different and gradually increasing pressures, and electromagnetic means for successively operating said actuating members as desired to make different applications of the brake, said electromagnetic means including a plurality of electromagnets, a source of electrical energy, a control switch having a plurality of fixed contacts, circuit branches leading from one side of the source of electrical energy to the respective contacts, each of said electromagnets being arranged in one of said circuit branches, and a movable switch member electrically connected with the other side of the source of electrical energy and having a contact to separately engage the fixed contacts.

4. In a brake, the combination with a brake element, of a series of movable actuating members operatively associated with the brake element and adapted to apply the brake element with different and gradually increasing pressures, a plurality of electromagnet sets for operating said members, the number of electromagnet sets being less than the number of actuating members and each actuating member being adapted to be operated by one of the electromagnet sets, a source of electrical energy, a control switch, a plurality of fixed contacts on the switch equal in number to the number of actuating members, circuit branches leading from one side of the source of electrical energy to some of the fixed contacts, each of said electromagnet sets being arranged in one of said circuit branches, circuit connections between each one of the remaining fixed contacts and one of the other fixed contacts, and a movable switch member electrically connected with the other side of the source of electrical energy and having a contact to separately engage the fixed contacts.

5. In a brake the combination of a brake element, of a series of movable actuating members operatively associated with the brake element and adapted to apply the brake with different and gradually increasing pressures, a plurality of electromagnets for successively operating the actuating members, an electromagnet being associated with each of the actuating members, only the first of the series of actuating members being in position to be affected by its electromagnet, means on some of the actuating members whereby other of the actuating members of the series will be successively brought into the effective zone of their respective electromagnets when the preceding actuating member has been operated by its magnet, a source of electrical energy, and controlling means for singly connecting the electromagnets therewith.

6. In a brake the combination with a brake element, of a series of movable actuating members operatively associated with the brake element and adapted to act independently of each other to apply the brake element with different and gradually increasing pressures, a plurality of electromagnets for successively operating said actuating members, one of said electromagnets being adapted to separately operate a plurality of the actuating members, the actuating members being normally spaced different distances from the electromagnets with only the first actuating member of the series within the effective range of its magnet, means on some of the actuating members whereby other actuating members of the series will be successively brought into the effective range of their magnets as the preceding actuating member has been operated by its magnet, a source of electrical energy, and controlling means for singly and in succession connecting the series of electromagnets therewith.

7. In a brake the combination with a brake element, of a series of actuating members disposed in opposite rows, said actuating members being operatively associated with the brake element and adapted to operate independently of each other to apply the brake element with different and gradually increasing pressures, a straight electromagnet supported between each pair of oppositely disposed actuating members, with poles thereof facing opposite actuating members and adapted to separately operate said actuating members, the series of actuating members being spaced different distances from the respective poles of the magnets with only the first actuating member of the series positioned within the effective range of its magnet, means operatively connecting the series of actuating members whereby each of the series will be successively brought into the effective range of its magnet as the preceding actuating member has been operated by its magnet, a source of electrical energy, and controlling means for singly connecting the electromagnets therewith to successively operate the series of actuating members.

8. In a brake the combination with a brake element, of a series of levers operatively associated with the brake element and adapted to act independently of each other to apply the brake element with different and gradually increasing pressures, a plurality of electromagnets for successively operating said levers, one of said electromagnets being adapted to separately operate a plurality of the levers, the levers being normally spaced different distances from the electromagnets with only the first lever of the series within the effective range of its magnet, means on some of the levers whereby other levers of the series will be successively brought into the effective range of their magnets as the preceding lever has been operated by its magnet, a source of electrical energy, and controlling means for singly and in succession connecting the series of electromagnets therewith.

9. In a brake the combination with a brake element, of a series of levers operatively associated with the brake element and adapted to act independently of each other to apply the brake element with different and gradually increasing pressures, a plurality of electromagnets for successively operating said levers, one of said electromagnets being adapted to separately operate a plurality of the levers, the levers being normally spaced different distances from the electromagnets with only the first lever of the series within the effective range of its magnet, means on some of the levers whereby other levers of the series will be successively brought into the effective range of their respective magnets as the preceding lever has been operated by its magnet, yieldable means acting to normally maintain the levers in a row against relative movement but permitting them to be operated by their magnets, a source of electrical energy, and controlling means for singly connecting the electromagnets therewith to successively operate the series of levers.

10. In a brake the combination with a brake element, of actuating means for applying the brake element with different pressures, said means including a rock shaft operatively connected with the brake element, a plurality of abutments on the shaft, a plurality of levers loosely mounted on the shaft to swing thereabout and each lever being adapted to engage one of the abutments to turn the shaft, and electromagnetic means for operating the levers.

11. In a brake the combination with a brake element, of operating means for the brake element including a longitudinally shiftable rod operatively connected with the brake element, a pair of spaced parallel rock shafts located one above the other, said rock shafts having respectively arms extending upwardly from one and downwardly from the other and pivotally connected with said rod, sets of abutments on the rock shafts, oppositely disposed sets of levers loosely mounted on the shafts to swing thereabout and adapted to engage the abutments to turn the rock shafts and shift the rod, and a series of electromagnets supported intermediate the rows of levers to operate the same.

In testimony whereof I hereunto affix my signature.

DALE R. FIGG.